(12) United States Patent
Le (10) Patent No.: US 6,890,188 B1
(45) Date of Patent: May 10, 2005

(54) MEMORY CARD COMPATIBLE WITH DEVICE CONNECTOR AND HOST CONNECTOR STANDARDS

(75) Inventor: Trung V. Le, White Bear Township, MN (US)

(73) Assignee: Imation Corp., Oakdale, MN (US)

( * ) Notice: Subject to any disclaimer, the term of this patent is extended or adjusted under 35 U.S.C. 154(b) by 0 days.

(21) Appl. No.: 10/788,623

(22) Filed: Feb. 27, 2004

(51) Int. Cl.$^7$ .............................................. H01R 12/00
(52) U.S. Cl. ...................................................... 439/76.1
(58) Field of Search ................................ 439/76.1, 638

(56) References Cited

U.S. PATENT DOCUMENTS

| | | | |
|---|---|---|---|
| 5,330,360 A | * | 7/1994 | Marsh et al. ............... 439/76.1 |
| 5,409,385 A | * | 4/1995 | Tan et al. ................... 439/76.1 |
| 5,413,490 A | * | 5/1995 | Tan et al. ................... 439/76.1 |
| 5,502,892 A | * | 4/1996 | Lien ............................. 29/841 |
| 5,565,704 A | * | 10/1996 | Tokuno ....................... 257/678 |
| 5,673,181 A | * | 9/1997 | Hsu ............................ 361/760 |
| 5,768,110 A | * | 6/1998 | Frommer et al. ............ 361/755 |
| 5,780,365 A | * | 7/1998 | Nogami ...................... 439/76.1 |
| 5,839,907 A | * | 11/1998 | Kuo ............................ 439/76.1 |
| 5,969,333 A | * | 10/1999 | Barthelemy et al. ......... 235/492 |
| 5,984,731 A | * | 11/1999 | Laity ............................ 439/676 |
| 6,004,144 A | * | 12/1999 | Yeh et al. ................... 439/76.1 |
| 6,132,223 A | * | 10/2000 | Seeley et al. ............... 439/76.1 |
| 6,148,354 A | | 11/2000 | Ban et al. |
| 6,257,902 B1 | * | 7/2001 | Shieh ........................ 439/76.1 |
| 6,381,143 B1 | | 4/2002 | Nakamura |
| 6,385,677 B1 | | 5/2002 | Yao |

(Continued)

FOREIGN PATENT DOCUMENTS

| | | |
|---|---|---|
| CN | 1304115 | 7/2001 |
| EP | 1 132 824 A2 | 9/2001 |
| EP | 1 197 826 A1 | 4/2002 |

OTHER PUBLICATIONS

Co-pending U.S. Appl. No. 10/644,484, filed Aug. 20, 2003, Trung V. Le, entitled "Memory Card Compatible with Multiple Connector Standards".
Co-pending U.S. Appl. No. 10/788,594, filed Feb. 27, 2004, Trung V. Le et al., entitled "Memory Card Host Connector with Retractable Shieldless Tab".
Co-pending U.S. Appl. No. 10/788,591, filed Feb. 27, 2004, Trung V. Le, entitled "Multi-Connector Memory Card with Retractable Sheath to Protect the Connectors".
Co-pending U.S. Appl. No. 10/788,600, filed Feb. 27, 2004, Trung V. Le et al., entitled "Credit Card Sized Memory Card with Host Connector".

*Primary Examiner*—Ross Gushi
(74) *Attorney, Agent, or Firm*—Eric D. Levinson (57) ABSTRACT

The invention is directed to a memory card that includes a device connector and a host connector that conform to a device connection standard and a host connector standard respectively. The dimensions of the memory card may substantially conform to dimensions of a memory card standard. However, there may be irregularities in the shape of the memory card that are not consistent with the form factor of the memory card standard. The memory card may further include a cover to fit over the host connector. In that case, the housing and the cover collectively define a form factor of the memory card that substantially conforms to a form factor of the memory card standard.

20 Claims, 10 Drawing Sheets

U.S. PATENT DOCUMENTS

| | | |
|---|---|---|
| 6,407,940 B1 | 6/2002 | Aizawa |
| 6,413,108 B2 * | 7/2002 | Centofante .................. 439/267 |
| 6,434,010 B1 * | 8/2002 | Hsu ........................... 361/737 |
| 6,434,648 B1 * | 8/2002 | Assour et al. ............... 710/305 |
| 6,457,647 B1 * | 10/2002 | Kurihashi et al. .......... 235/486 |
| 6,483,712 B1 * | 11/2002 | Oliphant et al. ............ 361/737 |
| 6,488,542 B2 * | 12/2002 | Laity ........................... 439/676 |
| 6,490,667 B1 | 12/2002 | Ikeda |
| 6,501,163 B1 | 12/2002 | Utsumi |
| 6,524,137 B1 * | 2/2003 | Liu et al. .................... 439/638 |
| 6,547,602 B2 * | 4/2003 | Price et al. .................. 439/638 |
| 6,567,273 B1 | 5/2003 | Liu et al. |
| 6,616,053 B2 | 9/2003 | Kondo et al. |
| 6,618,789 B1 | 9/2003 | Okaue et al. |
| 6,654,841 B2 | 11/2003 | Lin |
| 6,692,268 B2 * | 2/2004 | Kung et al. ................. 439/76.1 |
| 6,813,164 B2 * | 11/2004 | Yen ............................ 361/785 |
| 2002/0147882 A1 | 10/2002 | Pua et al. |
| 2002/0195500 A1 | 12/2002 | Maruyama |
| 2003/0095386 A1 | 5/2003 | Le et al. |

\* cited by examiner

MEMORY CARD COMPATIBLE WITH DEVICE CONNECTOR AND HOST CONNECTOR STANDARDS

TECHNICAL FIELD

The invention relates to removable storage media devices and, in particular, removable memory cards.

BACKGROUND

A wide variety of removable storage media exist for use with voice recorders, digital video camcorders, digital cameras, personal digital assistants (PDAs), cellular phones, video games, digital televisions, photo printers, and the like. The removable storage media allow users to capture and store data on such devices, and easily transport the data between these various devices and a computer.

One of the most popular types of removable storage media is the flash memory card, which is compact, easy to use, and has no moving parts. A flash memory card includes an internal, high-speed solid-state memory capable of persistently storing data without application of power. Numerous other memory standards can also be used in memory cards, including electrically-erasable-programmable-read-only-memory (EEPROM), non-volatile random-access-memory (NVRAM), and other non-volatile or volatile memory types, such as synchronous dynamic random-access-memory (SDRAM), with battery backup.

A wide variety of memory cards have been recently introduced, each having different capacities, access speeds, formats, interfaces, and connectors. Examples of memory cards include CompactFlash™ (CF) first introduced by SanDisk™ Corporation, the Memory Stick™ (MS) and subsequent versions including Memory Stick Pro and Memory Stick Duo developed by Sony Corporation, Smart Media™ memory cards, Secure Digital (SD) memory cards, and MultiMedia Cards (MMCs) jointly developed by SanDisk Corporation and Siemens AG/Infineon Technologies AG, and xD™ digital memory cards developed by Fuji.

Each of the different memory cards typically has a unique connector, which defines the electrical and mechanical interfaces of the card. Moreover, each different memory card generally requires a specialized adapter or reader for use with a computing device. The adapter or reader includes a specialized interface that conforms to that of the memory card, and an interface that can be accepted by a computer. For example, an adaptor or reader may include a device interface to receive a memory card and a host computer interface to connect to a host computer, such as a personal computer memory card international association (PCMCIA) standard including a 16 bit standard PC Card standard and a 32 bit CardBus standard, a Universal Serial Bus (USB) standard, a Universal Serial Bus 2 (USB2) standard, an IEEE 1394 FireWire standard, a Small Computer System Standard (SCSI) standard, an Advance Technology Attachment (ATA) standard, a serial ATA standard, a Peripheral Component Interconnect (PCI) standard, a PCI Express standard, a conventional serial or parallel standard, or the like.

Conventional memory cards have only one connector to interface with a device. The same connector also interfaces with the adaptor or reader to allow the memory card to be read by a host computer. Most conventional adapters and readers support only a single type of memory card, causing a user to carry and interchange adapters or readers when using different types of memory cards.

SUMMARY

The invention is directed to a memory card that includes a device connector and a host connector that conform to a device connection standard and a host connector standard respectively. For example, the device connector may conform to a Memory Stick (MS) standard, and the host connector may conform to a Universal Serial Bus (USB) standard. The host connector may include a USB tab without a conventional electrical shield.

The dimensions of the memory card may substantially conform to dimensions of a memory card standard. However, there may be irregularities in the shape of the memory card that are not consistent with the form factor of the memory card standard. For example, the form factor of the memory card may include one or more voids that would be part of a conventional memory card housing that has dimensions conforming to the same memory card standard.

The memory card may further include a cover to fit over the host connector. With the cover over the host connector, the memory card conforms to the form factor of the memory card standard. Moreover, the cover can protect the host connector from damage, electrostatics, or debris, during use of the device connector. A number of different exemplary covers are described.

In one embodiment, the invention is directed to a memory card comprising a housing, a memory in the housing, and a device connector accessible through the housing. The device connector conforms to a device connection standard and allows access to the memory by a device compatible with the device connection standard. The memory card further comprises a host connector protruding from the housing. The host connector conforms to a host connection standard and allows access to the memory upon insertion of the host connector into a host computer interface compatible with the host connection standard. The housing and the host connector protruding from the housing define memory card dimensions which substantially conform to dimensions of a memory card standard including a height that is one of approximately 31 mm and approximately 50 mm, a width that is one of approximately 20 mm and approximately 21.5 mm, and a thickness that is one of approximately 1.6 mm and approximately 2.8 mm. A cover may also be included over the host connector and can be sized such that the housing and the cover collectively conform to a form factor of the memory card standard.

In another embodiment, the invention is directed to a memory card comprising a housing, a memory in the housing, and a device connector accessible through the housing. The device connector conforms to the device connection standard and allows access to the memory by a device compatible with the device connection standard, such as a digital camera or other portable device. The memory card further comprises a host connector protruding from the housing. The host connector conforms to a host connection standard and allows access to the memory upon insertion of the host connector into a host computer interface compatible with the host connection standard. The memory card also comprises a cover to fit over the host connector, wherein the housing and the cover collectively define a form factor of the memory card that substantially conforms to a form factor of the memory card standard.

The invention is capable of providing one or more advantages. For example, the need for an adapter or reader to couple the memory card to a computing device is eliminated. Instead, the memory card can be coupled directly to a host computer device without using an adapter or reader. Accordingly, the memory card can be inserted into a portable device that conforms to the memory card standard or the host connector can be directly inserted into a host computer interface, such as a USB interface.

The cover can protect the host connector from damage when not in use. In particular, the cover can protect the host connector from handling by a user and avoid the collection of electrostatics, dust or debris. If desired, an additional cover may be provided for the device connector. In any case, the housing and the cover over the host connector may define a form factor which conforms to a form factor of the memory card standard. Such a form factor improves the aesthetics of the memory card and also allows for compatibility with memory card accessories, such as a storage case.

In one embodiment, the host connector comprises a shieldless USB tab. For example, the shieldless USB tab may be a Uniform Serial Bus (USB) tab without a conventional electrical shield. In that case, the cover can protect the shieldless USB tab from user handing when the user holds the card for insertion into a portable device. A shieldless USB tab is substantially thinner than a conventional USB interface that includes the shield. Accordingly, this ensures that the host connector does not add thickness to the memory card that would undermine insertion of the memory card into a portable device.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
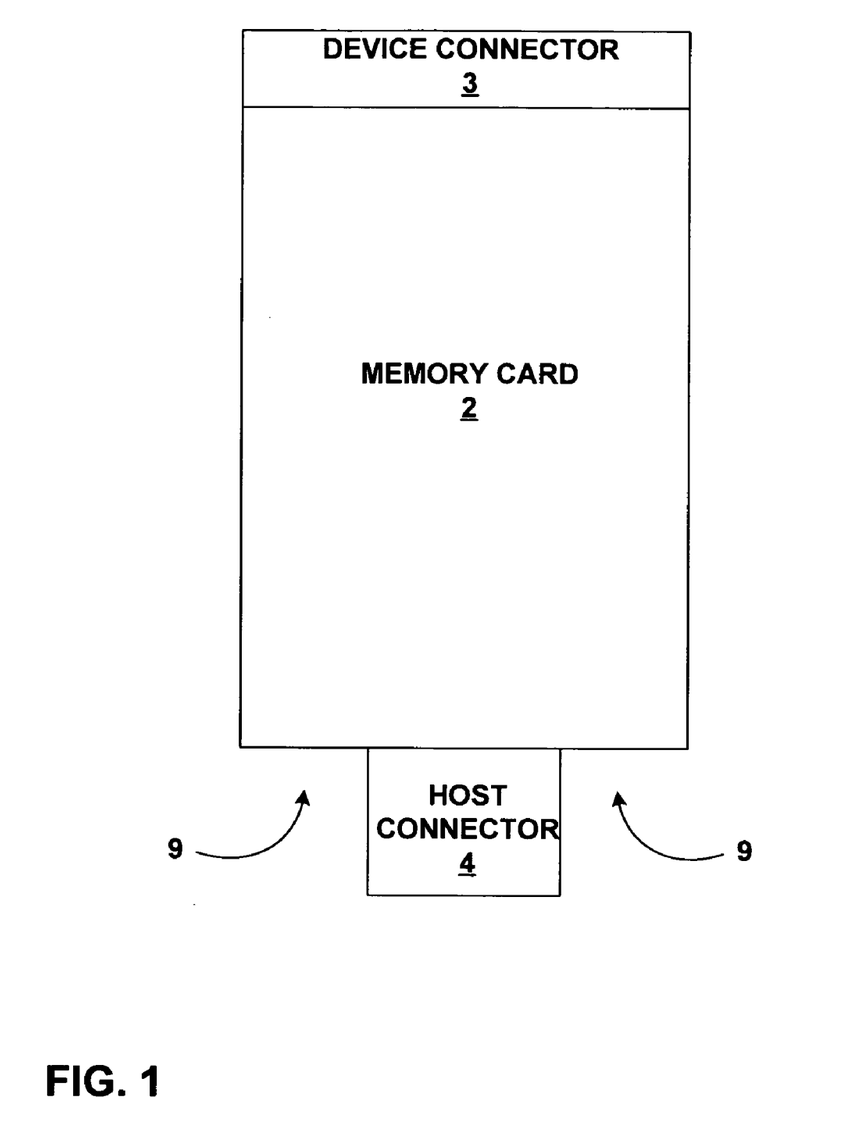
FIG. 1 is a block diagram of an exemplary memory card that includes a device connector and a host connector that conform to a device connection standard and a host connector standard respectively.

FIG. 1 is a block diagram of an exemplary memory card 2 that includes a device connector 3 and a host connector 4 that conform to a device connection standard and a host connector standard respectively. For example, device connector 3 may conform to a Memory Stick standard, and host connector 4 may conform to a Universal Serial Bus (USB) standard.

As described in greater detail below, host connector 4 may comprise a shieldless USB tab. For example, the shieldless USB tab may be a Uniform Serial Bus (USB) tab without a conventional electrical shield. A shield is necessary in a conventional tab to improve a physical wire connection and signal transmission. However, the tab connects directly to a USB port in the embodiments of the invention. Therefore, the need for a wire, and a shield for the wire, is eliminated. In accordance with the invention, other standards may similarly be supported via a shieldless tab, i.e., non-USB standards in which a shield is conventionally included on the connector used but could be eliminated on a memory card.

A cover (not shown in FIG. 1) can protect the shieldless USB tab from user handing when the user holds memory card 2 for insertion into a portable device. A shieldless USB tab is much thinner than a conventional USB interface that includes the shield. Accordingly, elimination of the shield ensures that the host connector does not add thickness to the memory card that would undermine insertion of the memory card into a portable device.

Various memory card designs are also described which include a cover (not shown in FIG. 1) to protect host connector 4 from damage when not in use. In particular, the cover can protect host connector 4 from handling by a user, and reduce the collection of electrostatics, dust or debris on host connector 4. As described herein, the housing and the cover may define a form factor which conforms to a form factor of the memory card standard. Such a form factor improves the aesthetics of the memory card and also allows for compatibility with memory card accessories, such as storage case, or other accessories that are affected by the form factor of the memory card.

The dimensions of memory card 2, such as height width and thickness, may substantially conform to dimensions of a memory card standard. However, there may be irregularities in the shape of memory card 2 that are not consistent with the form factor of the memory card standard. For example, the form factor (or shape) of memory card 2 may include one or more voids 9 that would correspond to portions of a housing of a conventional memory card. Thus, while the dimensions of memory card 2 may correspond to the dimensions defined by the standard, the form factor may be different. The addition of a cover over host connector 4, however, causes compliance with the form factor of the memory card standard.

Figure 2:
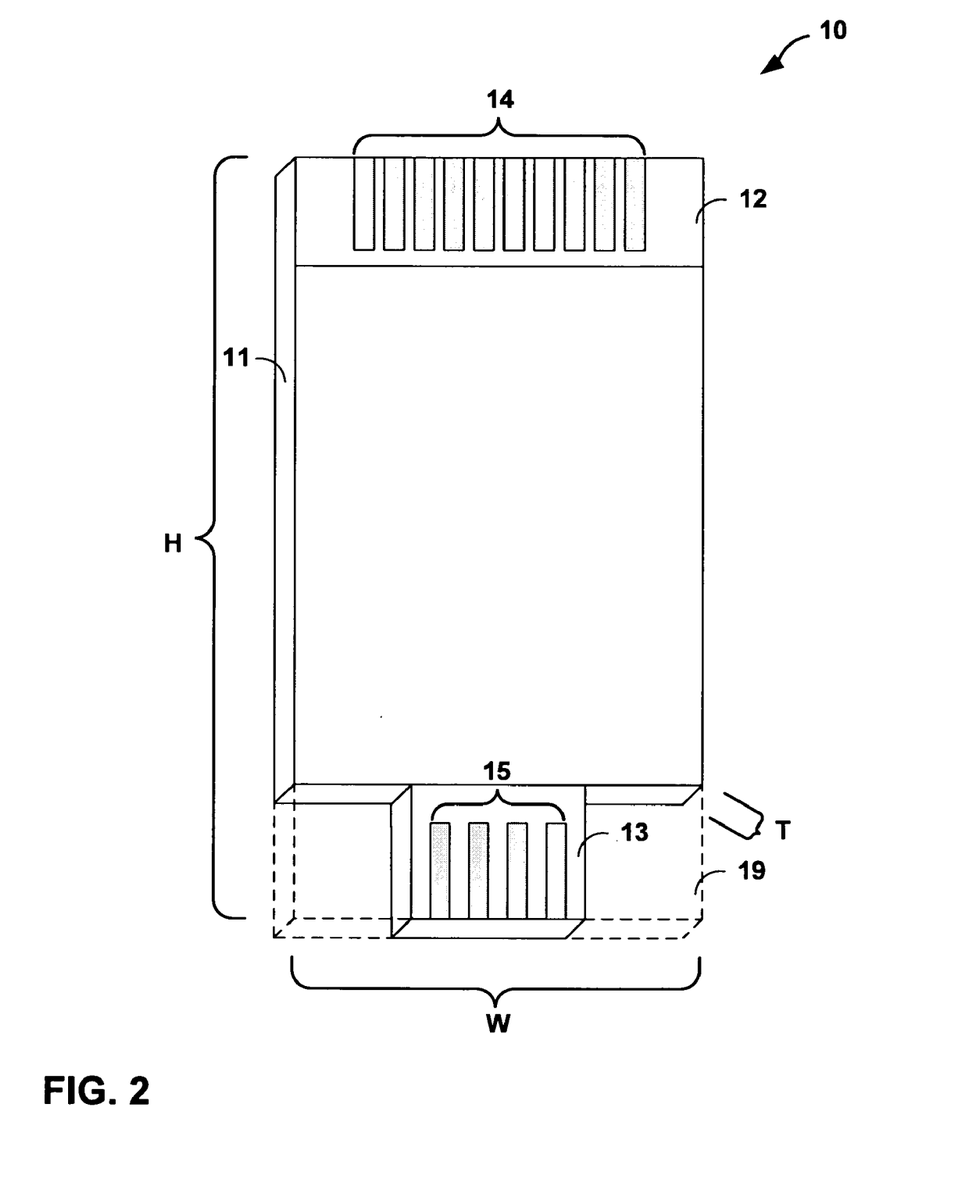
FIG. 2 is a perspective view of an exemplary memory card that includes a device connector accessible through a housing and a shieldless tab protruding from the housing.

FIG. 2 is a perspective view of an exemplary memory card 10 that includes a device connector 12 accessible through housing 11 and a shieldless tab 13 protruding from the housing. Again, shieldless tab 13 is one example of a host connector in accordance with the invention. In other examples, different types of host connectors may be used with or without shields. In order to support USB, however, the elimination of the conventional shield may be necessary in order to ensure that the thickness of memory card 10 does not present problems.

Housing 11 and shieldless tab 13 define memory card dimensions that substantially conform to dimensions of a memory card standard. As shown, the dimensions of memory card 10 substantially conform to the dimensions of a Memory Stick standard, such as Memory Stick, Memory Stick PRO, Memory Stick Duo, Memory Stick PRO Duo, or the like. More specifically, the dimensions of memory card 10 may include a height (H) that is one of approximately 31 mm and approximately 50 mm, a width (W) that is one of approximately 20 mm and approximately 21.5 mm, and a thickness (T) that is one of approximately 1.6 mm and approximately 2.8 mm. The Memory Stick and Memory Stick PRO standards define a height of 50 mm, a width of 21.5 mm, and a thickness of 2.8 mm. The Memory Stick Duo and Memory Stick PRO Duo standards define a height of 31 mm, a width of 20 mm, and a thickness of 1.6 mm. In accordance with the invention, the card can substantially conform to these dimensions, yet include a host connector, such as shieldless USB tab 13.

As mentioned above, device connector 12 and shieldless tab 13 may conform to a device connection standard and a host connection standard respectively. For example, the device connector may conform to a Memory Stick standard. In other embodiments, however, device connector 12 could alternatively conform to a Compact Flash standard, a Smart Media standard, a MultiMedia Card standard, a Secure Digital standard, and subsequent versions including Memory Stick Pro and Memory Stick Duo, an xD standard, a yet released standard, or the like.

Shieldless tab 13 may conform to a 13 bit standard PC Card standard and a 32 bit standard CardBus standard, a Universal Serial Bus (USB) standard, a Universal Serial Bus 2 (USB2) standard or a future generation USB standard. In other embodiments, however, shieldless tab 13 could conform to an IEEE 1394 FireWire standard, a Small Computer System Interface (SCSI) standard, an Advance Technology Attachment (ATA) standard, a serial ATA standard, a Peripheral Component Interconnect (PCI) standard, a PCI Express standard, a conventional serial or parallel standard, or another host connector standard. As shown in FIG. 2, device connector 12 of memory card 10 conforms to a Memory Stick standard, and shieldless tab 13 conforms to a USB standard.

In this case, it is necessary to limit the thickness of shieldless tab 13 so the thickness of shieldless tab 13 does not exceed the thickness (T) of memory card 10. In these embodiments, shieldless tab 13 may include a USB tab without a conventional electrical shield. The thickness of the shieldless USB tab may be less than a conventional USB tab. In fact, the thickness of the shieldless USB tab may be such that insertion of memory card 10 into a portable device is possible, which might not be the case if the shield were included.

As shown, shieldless tab 13 is placed opposite from the device connector 12. However, shieldless tab 13 can be placed anywhere on memory card 10. For example, shieldless tab 13 may be positioned along any edge or face of the memory card, such as an edge adjacent to device connector 12. Although shieldless tab 13 is shown in a central region of an edge opposite device connector 12, shieldless tab 13 may be offset relative to the center of the edge. In one embodiment, shieldless tab 13 has a thickness that is less than or equal to the thickness of the memory card. In another embodiment, memory card 10 includes a plurality of host connectors some or all of which and may or may not comprise shieldless tabs.

In one embodiment, device connector 12 couples to a portable device connector which conforms to the same device connection standard of device connector 12 and operates in a similar manner to a device connector of a conventional memory card. Additionally, shieldless tab 13 couples directly to a computing device port conforming to the same host connection standard and enables communication between the computing device and memory controller 12. In this or a similar embodiment, the need for an adapter or reader to couple memory card 10 to a computing device is eliminated.

However, having more than one connector on memory card 10 can present several problems due to exposed device connector electrical contacts 14 or USB electrical contacts 15. For example, a user might hold USB electrical contacts 15 when inserting memory card 10 into a portable device.

Similarly, a user might hold device connector electrical contacts 14 when inserting memory card 10 into a host computer. In that case, the electrical contacts could suffer damage if left unprotected. For example, electrostatics, dust, human oils, or other debris could collect on exposed electrical contacts, negatively affecting the functionality of memory card 10. The vulnerable nature of shieldless tab 13, e.g., because of the absence of the shield, further increases the need for a protective cover to fit over the shieldless tab.

In order to decrease these and other potential problems associated with exposed contacts on the connectors, a cover 19 may be used to protect shieldless tab 13 when not in use. The cover 19 may be sized to fit over shieldless tab as shown in FIG. 2. In particular, cover 19 may be positioned to fit over the shieldless tab 13, and to allow the device connector 12 to be inserted into a portable device compatible with the device connection standard.

While protecting the memory card 10 and the user from potential harm, cover 19 and housing 11 collectively define a form factor of the memory card that substantially conforms to a form factor of the memory card standard. This allows memory card 10 to be used in place of a conventional memory card.

Several example embodiments of covers are discussed below. In one embodiment, cover 19 is removable from the rest of memory card 10. In other embodiments, cover 19 can be rotated relative to housing 11 via a hinge. In further embodiments, the cover can be retracted over the housing 11. In each embodiment, cover 19 may have other features, as well. For example, a locking mechanism may be added to memory card 10 to keep the cover attached to memory card 10. In some embodiments, a spring may be connected to memory card 10 to bias the positioning of the cover relative to the memory card. These and other features may be added to any of the exemplary covers discussed below.

Figure 3:
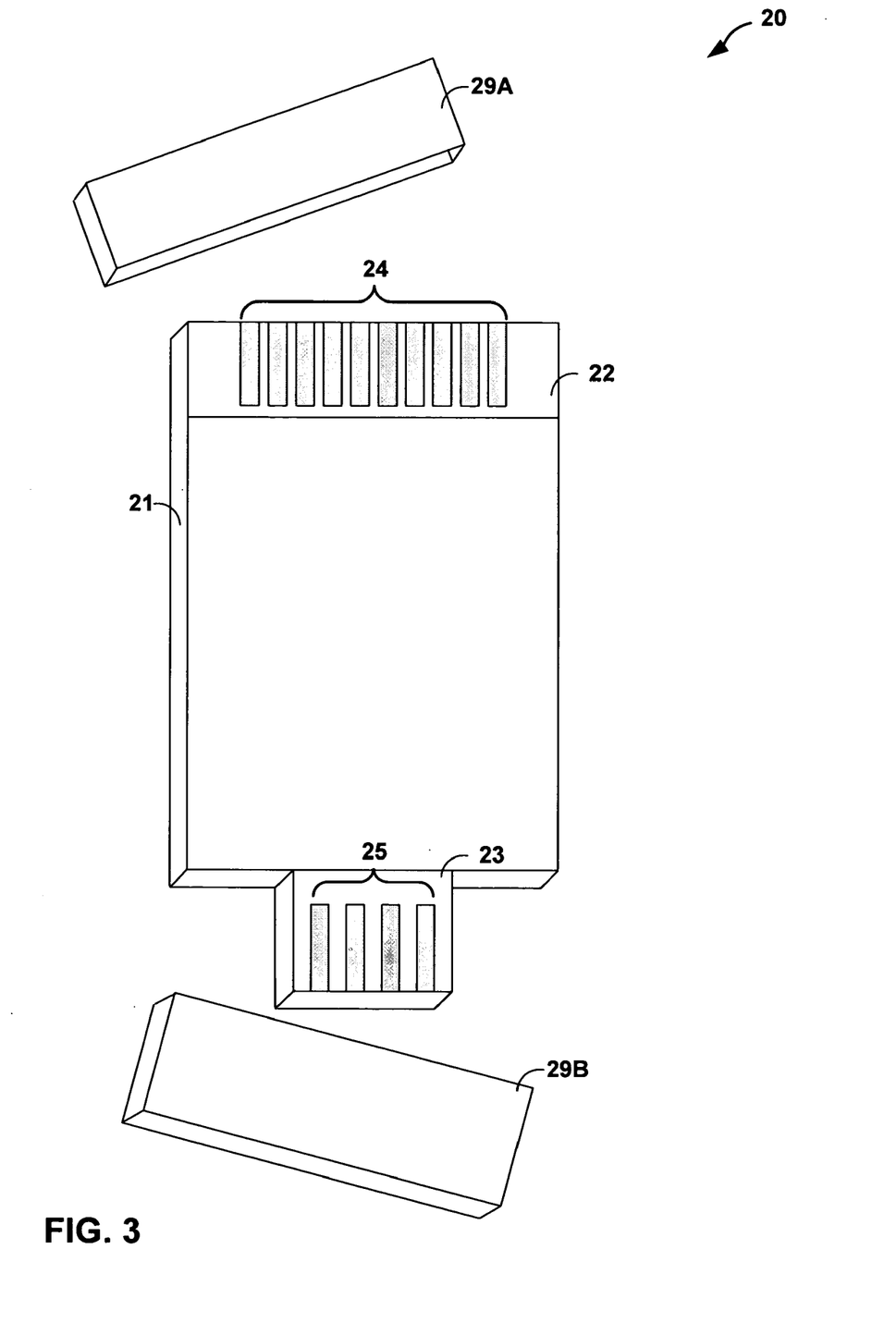
FIG. 3 is a perspective view of an exemplary memory card with covers over a device connector and a shieldless Universal Serial Bus (USB) tab.

FIG. 3 is a perspective view of an exemplary memory card 20 with covers 29A, 29B over a device connector 22 and a shieldless USB tab 23 respectively. In general, cover 29B fits over shieldless USB tab 23. In some embodiments, cover 29A fits over device connector 22. Covers 29A, 29B protect exposed device connector electrical contacts 24 or USB electrical contacts 25, which are accessible through a housing 21 of memory card 20. In addition, cover 29A or cover 29B join housing 21 to collectively define a form factor of memory card 20 that conforms to a form factor of a memory card standard.

Although only cover 29B may be necessary to conform the form factor of memory card 20 to a form factor of a memory card standard, both cover 29A and cover 29B may be used in some cases. As shown in FIG. 2, cover 29A fits over device connector 22 while cover 29B fits over shieldless USB tab 23.

The exteriors of covers 29A, 29B may be shaped to conform memory card 20 to the form factor of the memory card standard when the covers are fitted over device connector 22 and shieldless USB tab 23, respectively. The interiors of covers 29A, 29B define a cavity larger than device connector 22 and shieldless USB tab 23, respectively. This allows covers 29 to fit over connectors 22,23. In one embodiment, the interiors of covers 29 each conform to the shape of corresponding connectors 29. A locking mechanism, biasing spring, or other device may be used to secure one or both of covers 29 to housing 21. As described below, a hinge may secure a side of cover 29B to housing 21.

Figure 4A:
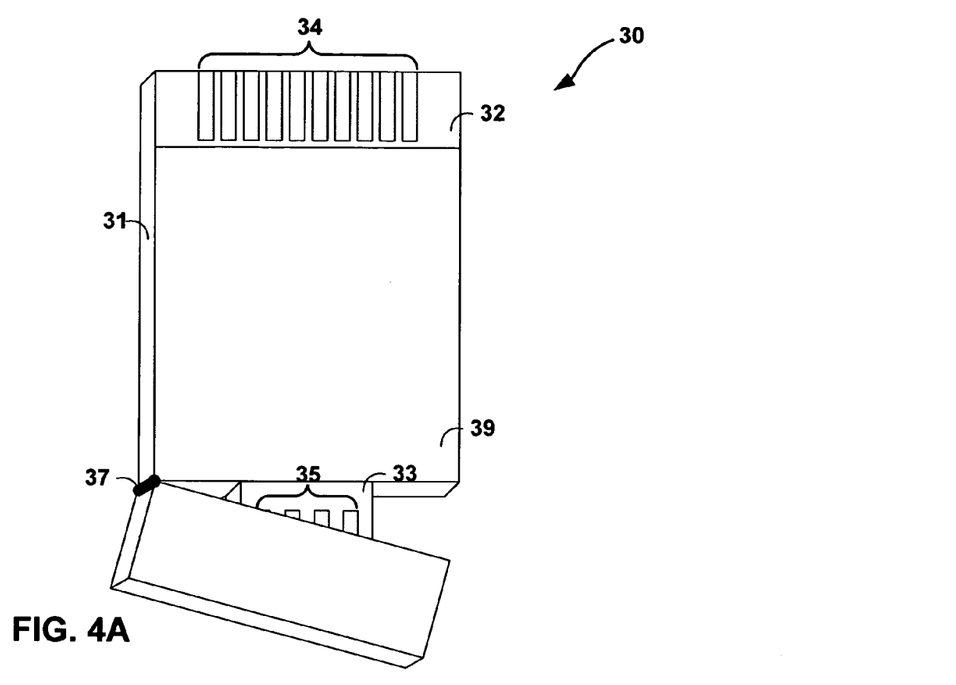
FIGS. 4A and 4B are perspective views of an exemplary memory card with a hinged cover that fits over a shieldless USB tab of the memory card.
Figure 4B:
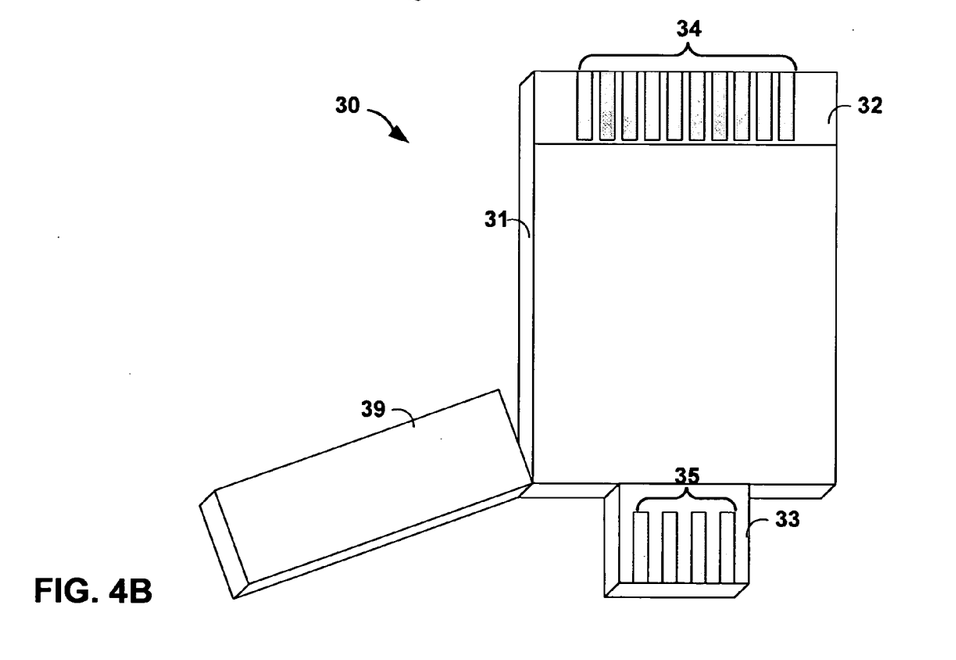

FIGS. 4A and 4B are perspective views of an exemplary memory card 30 with a hinged cover 39 over a shieldless USB tab 33 of the memory card 30. As shown in FIG. 4A, hinged cover 39 rotates about hinge 37, which is connected to a housing 31 and cover 39. Hinged cover 39 protects electrical contacts 35 of shieldless tab 33 and also protects shieldless tab 33 from breakage. If desired, another hinged cover (not shown) may be used to cover electrical contacts 34 of device connector 32.

Hinged cover 39 may be positioned to cover shieldless USB tab 33 so that the housing 31 and the cover 39 collectively conform the form factor of memory card 30 to a form factor of the memory card standard. Moreover, for memory card 30 to be compatible with portable devices, memory card 30 may be required to have dimensions that conform to the dimensions of the memory card standard. In addition, a conforming form factor may allow memory card 30 to be compatible with memory card storage units, or other accessories which depend on the form factor of the memory card.

FIG. 4B is a perspective view of the memory card 30 of FIG. 4A with the hinged cover 39 in an open position allowing access to shieldless USB tab 33. With the hinged cover open, shieldless USB tab 33 can be inserted into a computer interface compatible with the shieldless USB tab.

Figure 5A:
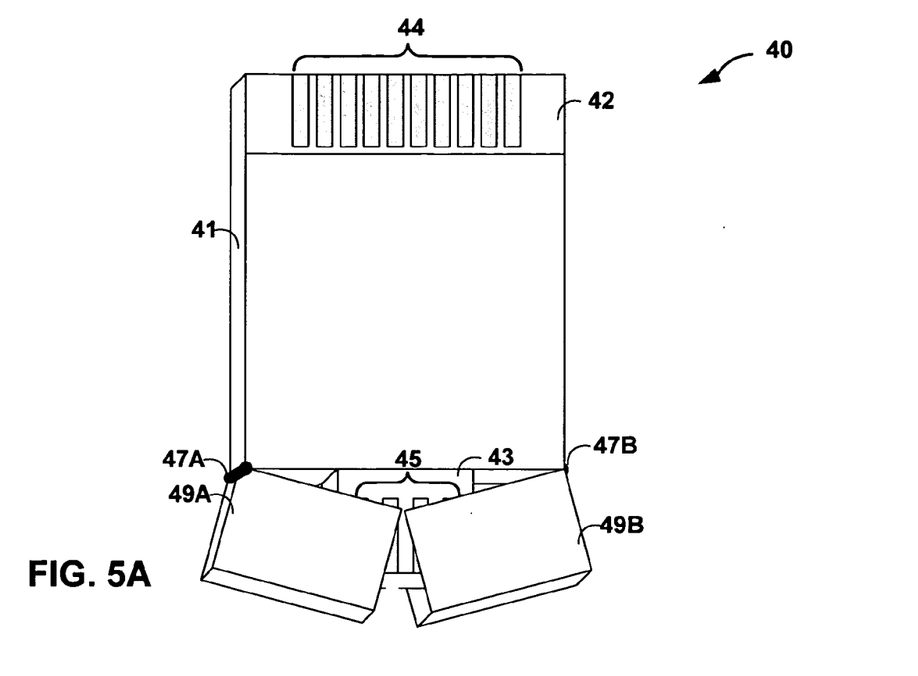
FIGS. 5A and 5B are perspective views of an exemplary memory card with a hinged cover that includes multiple sections over a shieldless USB tab of the memory card.
Figure 5B:
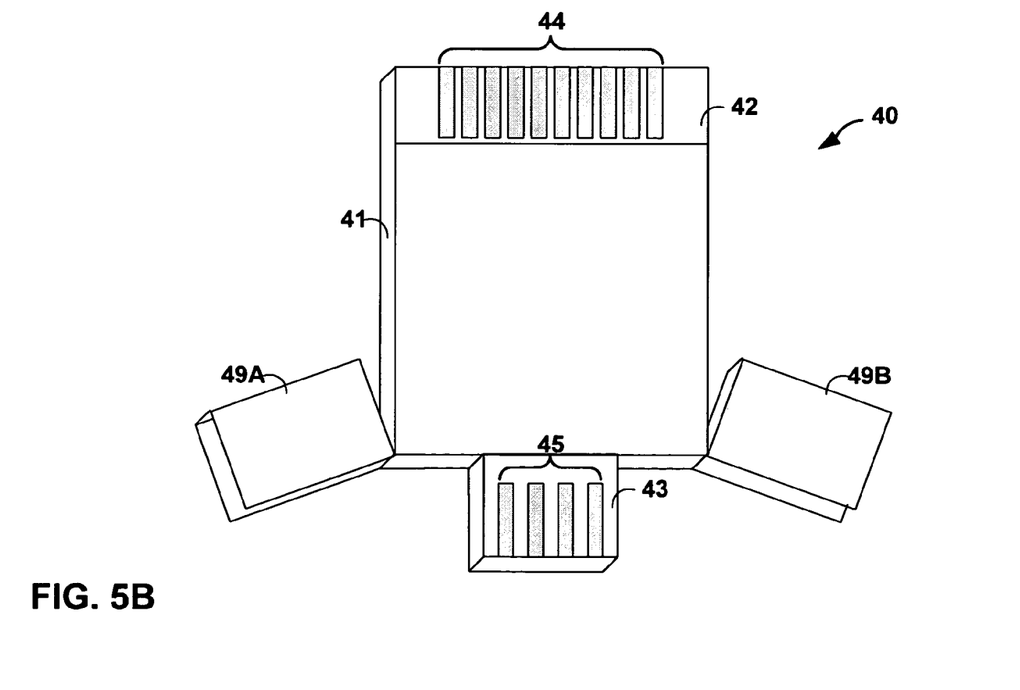

FIGS. 5A and 5B are perspective views of an exemplary memory card 40 with a hinged cover that includes multiple sections 49A, 49B (collectively "sections 49") over a shieldless USB tab 43 of the memory card. As shown in FIG. 5A, sections 49A, 49B rotate about hinges 47A, 47B respectively. In an alternative embodiment (not shown), hinged cover sections 49 protect exposed device connector electrical contacts 44, which are accessible through a housing 41 of memory card 40. Although the hinged cover sections 49 could cover either or both of the connectors, hinged cover sections 49 are shown covering the shieldless USB tab 43 and protecting USB electrical contacts 45.

Hinged cover sections 49 may be positioned to cover the shieldless USB tab so that the housing 41 and the cover sections 49 collectively conform the form factor of memory card 40 to a form factor of the memory card standard.

FIG. 5B is a perspective view of the memory card 40 of FIG. 5A with sections 49 in an open position allowing access to shieldless USB tab 33. With the hinged cover sections 49 open, shieldless USB tab 43 of memory card 40 allows access to a memory within memory card 40 upon insertion of the shieldless USB tab 43 into a computer interface compatible with the host connection standard.

Figure 6A:
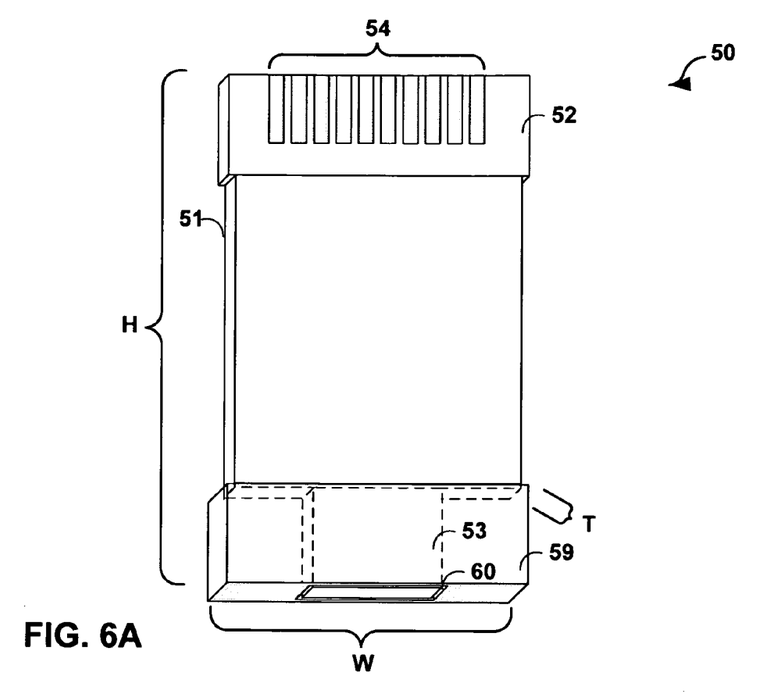
FIGS. 6A and 6B are perspective views of an exemplary memory card with a retractable cover over a shieldless USB tab.
Figure 6B:
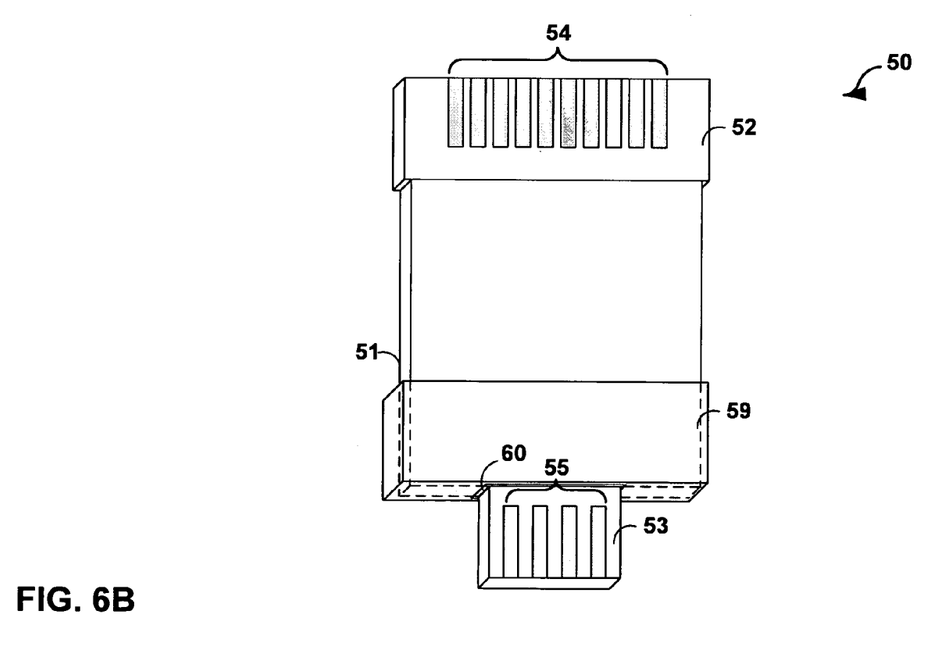

FIGS. 6A and 6B are perspective views of an exemplary memory card 50 with a retractable cover 59 over a shieldless USB tab 53. As shown, retractable cover 59 is positioned to cover shieldless USB tab 53 so that a housing 51 and the retractable cover 59 collectively conform the memory card to a form factor of the memory card standard.

Retractable cover 59 protects USB electrical contacts 55, which are accessible through a housing 51 of memory card 50. Although retractable cover 59 could cover either USB electrical contacts 55 or device electrical contacts 54, retractable cover 59 is shown covering the shieldless USB tab 53 and protecting USB electrical contacts 55. With the retractable cover 59 positioned to cover shieldless USB tab 53, the dimensions of memory card 50 may substantially conform to dimensions of a memory card standard. More specifically, the dimensions of memory card 50 may include a height (H) that is one of approximately 31 mm and approximately 50 mm, a width (W) that is one of approximately 20 mm and approximately 21.5 mm, and a thickness (T) that is one of approximately 1.6 mm and approximately 2.8 mm.

As shown in FIG. 6A, retractable cover 59 is sized to fit over at least a portion of a housing 51. An opening 60 in retractable cover 59 defines a size that substantially corresponds to shieldless USB tab 53, device connector 52, or housing 51. More specifically, opening 60 is sized to receive at least a portion of shieldless USB tab 53, device connector 52, or housing 51. In one embodiment, a width (W) and thickness (T) of a portion of housing 51 between device connector 52 and shieldless USB tab 53 are slightly less than the standard dimensions of a memory card standard. This allows cover 59 to retract over housing 51, while the form factor of memory card 50 still substantially conforms to a form factor of a memory card standard. In another embodiment, the width W and thickness T of the portion of housing 51 between device connector 52 and shieldless USB tab 53 conform to the dimensions of the memory card standard, but the width W and thickness T of the retractable cover 59 are slightly greater than the dimensions of a memory card standard. This also allows cover 59 to retract over housing 51, while the form factor of memory card 50 still substantially conforms to a form factor of a memory card standard.

FIG. 6B is a perspective view of the memory card 50 of FIG. 6A with the retractable cover 59 in a retracted position. With the retractable cover 59 in the retracted position, shieldless USB tab 53 of memory card 50 allows access to a memory (not shown in FIG. 6) within memory card 50. Shieldless USB tab 53 may be inserted into a computer interface compatible with the shieldless USB tab 53. Further, because device connector 52 is uncovered, device connector 52 allows access to the memory within memory card 50 upon insertion of the device connector into a device interface compatible with the device connection standard.

As mentioned above, a locking mechanism may be added to retractable cover 59 to keep the cover attached to memory card 50 in certain positions. The locking mechanism may allow retractable cover 59 to be removed from memory card 50 if the locking mechanism is unlocked.

In addition, a spring may be connected to retractable cover 59 or memory card 50 to bias the positioning of the cover relative to the memory card. For example, a spring may apply a force on retractable cover 59 so that the cover tends to move to or stay at a position over shieldless USB tab 53. In some cases, the user may retract cover 59 to expose shieldless tab USB 53 and insert shieldless tab into a USB port of a computer. In that case, the computer housing may hold cover 59 in the retracted position as long as shieldless USB tab 53 remains inserted into the USB port.

In one embodiment, retractable cover 59 is retractable over both device connector 52 and shieldless USB tab 53. Moreover, at least one of device connector 52 and shieldless USB tab 53 may extend through opening 60 when retractable cover 59 is retracted over a housing 51.

Figure 7:
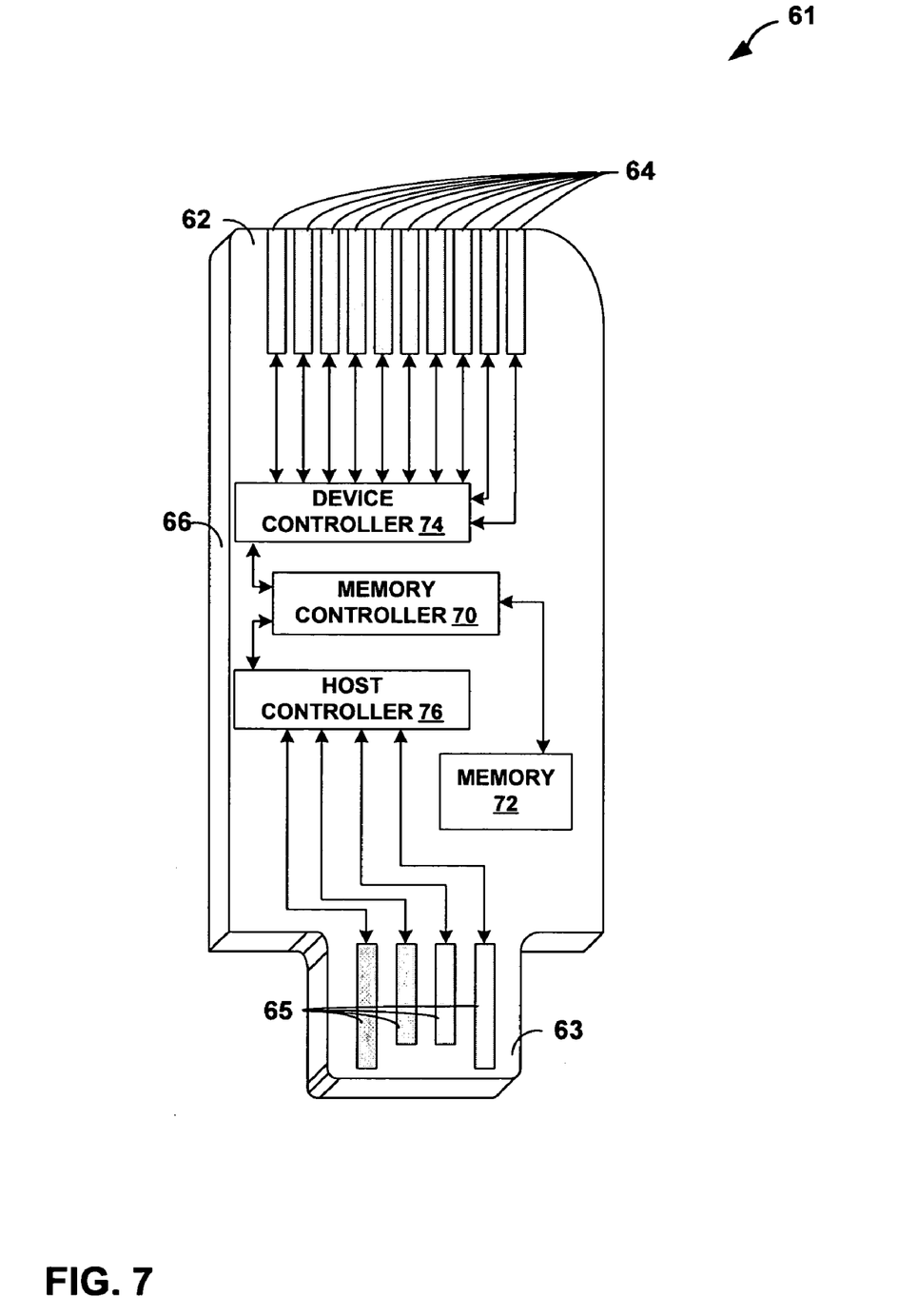
FIGS. 7–10 are block diagrams illustrating an exemplary memory cards according to embodiments of the invention.

FIG. 7 is a block diagram illustrating an exemplary memory card 61 according to embodiments of the invention. Memory card 61 includes a device connector 62 accessible through housing 66, and a shieldless Universal Serial Bus (USB) tab 63 protruding from the housing. In particular, housing 66 and shieldless USB tab 63 define memory card dimensions that substantially conform to dimensions of a memory card standard. As shown, the dimensions of memory card 10 substantially conform to the dimensions of a Memory Stick standard. More specifically, the dimensions of memory card 61 may include a height that is one of approximately 31 mm and approximately 50 mm, a width that is one of approximately 20 mm and approximately 21.5 mm, and a thickness that is one of approximately 1.6 mm and approximately 2.8 mm.

In order to decrease potential problems associated with exposed contacts on the shieldless USB tab 63, a cover (not shown in FIG. 7) is added to the memory card 61 to cover the shieldless USB tab 63. The cover may be positioned to cover the shieldless USB tab 63, and to allow the device connector 62 to be inserted into a portable device compatible with the device connection standard. Positioning of the cover may be done by any technique described above, such as removing the cover, rotating the cover via a hinge, forcing the cover to retract over the housing 66, or the like.

As shown in FIG. 7, memory card 61 may include a memory 72 and three control units. The control units include memory controller 70, device controller 74, and host controller 76. Device connector 62 may be electrically coupled to memory 72 via device controller 74 and a memory controller 70. Shieldless USB tab 63 may be electrically coupled to memory 72 via host controller 76 and memory controller 70. By way of example, memory 72 may comprise flash memory, electrically-erasable-programmable-read-only-memory (EEPROM), non-volatile random-access-memory (NVRAM), and other nonvolatile or volatile memory types, such as synchronous dynamic random-access-memory (SDRAM), or the like.

In one embodiment, memory controller 70 may accept firmware updates from host controller 76 via shieldless USB tab, allowing for easy upgrades of memory card 61. Memory 72 may include flash ROM partitioned to store such firmware in a first section and use the remaining memory for standard storage capabilities. Thus, firmware updates may be stored in a first partitioned section of the memory and a data storage area may be defined in a second section of the memory. Moreover, memory controller 70 may repartition memory 72 at the time a firmware update is received. This will ensure adequate storage space if the firmware update is larger than the original firmware and will improve storage capabilities of the memory card if the firmware update is smaller than the original firmware.

Power is applied to memory card 61 when it is connected via a device connection standard to a portable device or via a host connection standard to a computing device. The application of power allows the portable device or computing device to determine which electrical contact elements are active. Accordingly, the portable device or computing device can determine which of device connector 62 and shieldless USB tab 63 is being used based on which electrical contact elements are active.

Device controller 74 or host controller 76 is enabled to facilitate access to memory 61, depending on which of device connector 62 and shieldless USB tab 63 is being used. Communication between the portable device or computing device and memory controller 70 may then be sent through the powered connector and the enabled controller. The portable device or computing device may read or modify data that is stored in memory 72 as well as store new data or erase existing data. Memory controller 70 manipulates the data stored in memory 72 according to operations specified by the portable device or computing device.

As described above, a cover may be used for protecting memory card 61. Alternatively, memory card 61 may comprise ridges that extend from device connector 62 between the electrical contacts 64 of device connector 62. In a similar manner, memory card 61 may comprise ridges that extend from shieldless USB tab 63 between the electrical contacts 65 of shieldless USB tab 63. The ridges prevent substantial contact with the electrical contacts 65.

Figure 8:
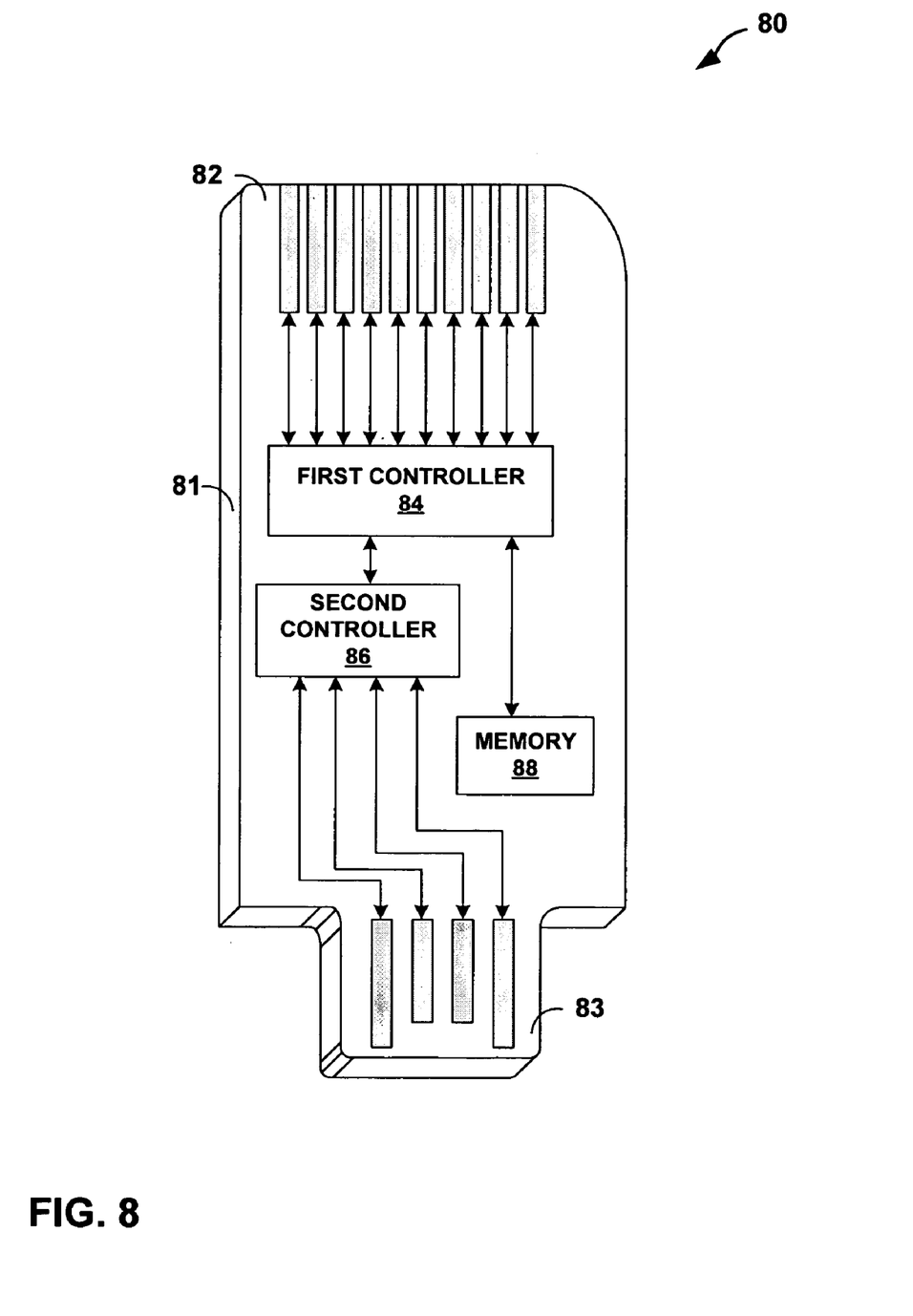

FIG. 8 is a block diagram illustrating an exemplary memory card 80 that can be used according to embodiments of the invention. Memory card 80 includes a memory 88, a device connector 82, a shieldless Universal Serial Bus (USB) tab 83, a first controller 84, a second controller 86, and a housing 81.

As in FIG. 7, memory 88 may comprise flash memory such as flash ROM, electrically-erasable-programmable-read-only-memory (EEPROM), non-volatile random-access-memory (NVRAM), and other nonvolatile or volatile memory types, such as synchronous dynamic random-access-memory (SDRAM), or the like.

The architecture of memory card 80 differs from that of memory card 61. Whereas, the architecture shown in FIG. 7 utilizes three separate controllers, i.e., one for device connector 62, one for shieldless USB tab 63, and one for the memory 72, the embodiment of FIG. 8 integrates the memory controller with the controller for device connector 82 as a common first controller 84. Such an integrated first controller 84 may consume less space and power than separate controllers. Moreover, controllers that integrate memory and device connector controllers are commercially available and commonly used in conventional memory cards that do not include host connectors.

First controller 84 controls memory 88 and output via device connector 82. The second controller 86 controls output via shieldless USB tab 83. Device connector 82 may be electrically coupled directly to first controller 84 and then to memory 88, while shieldless USB tab 83 may be electrically coupled to memory 88 via second controller 86.

Memory card 80 may also include first controller 84 conforming to a flash memory controller, memory 88 conforming to a flash memory, and second controller 86 conforming to a USB controller. These components are readily available due to their wide usage in traditional removable memory cards and adapters or readers. Flash memory controllers are manufactured by SanDisk™ Corporation and Lexar Media Inc., among others. Many companies including Intel, Samsung, and Toshiba produce flash memory. USB controllers are typically found in flash memory card adaptors or readers and other devices utilizing USB connectivity. Such controllers are available from Cypress Semiconductor Corporation, Philips Semiconductors, and many other semiconductor companies. In this embodiment, substantially all the elements included in memory card 80 are already being produced for other purposes and may be purchased directly from the manufacturer.

Memory card 80 may also include device connector 82 conforming to a device connection standard and shieldless USB tab 83 conforming substantially to a USB standard. In that case, memory card 80 functions as an external storage device that is able to couple to a computing device via several ports conforming to different device connection standards.

Another embodiment includes additional connectors (not shown) disposed on memory card 80. The connectors each conform to either a device connection standard or a host connection standard. Extra connectors allow memory card 80 to couple to several portable device contacts and several computing device ports. In any case, additional connectors, each conforming to a different standard, add versatility to memory card 80 and may eliminate the need for individual memory cards, external storage devices, and adaptors or readers.

Figure 9:
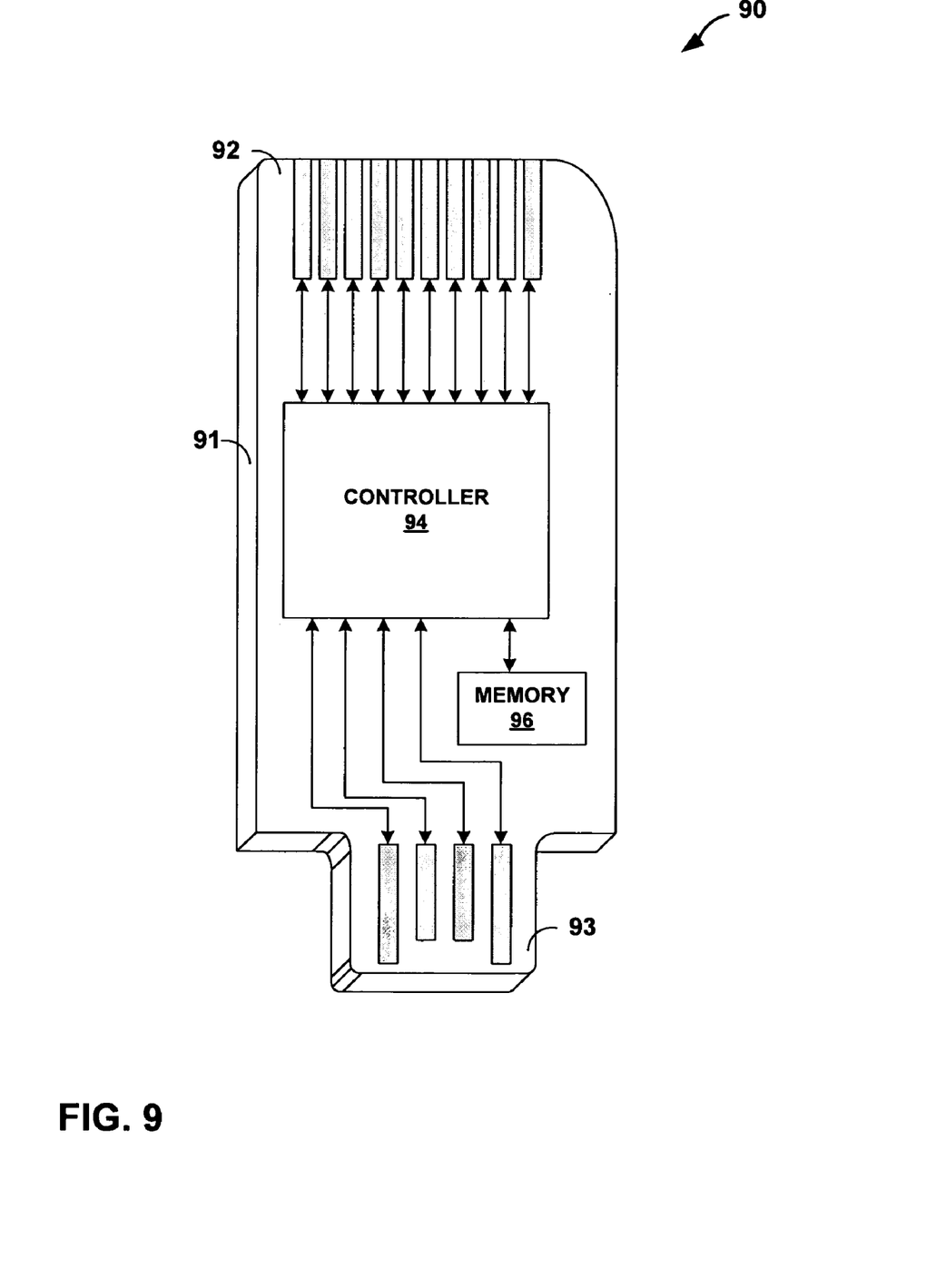

FIG. 9 is a block diagram illustrating an exemplary memory card 90 that can be used according to embodiments of the invention. As shown, memory card 90 includes a memory 96, a device connector 92, a shieldless Universal Serial Bus (USB) tab 93, a housing 91, and a controller 94.

Controller 94 comprises a memory controller integrated with a device connector controller and a USB controller. Whereas the architecture shown in FIG. 7 utilizes a separate controller for each connector 62, 63 and the memory 72, controller 94 integrates such functionality of three different controllers into a common unit. By integrating the functionality of each separate controller into controller 94, less space and power may be consumed on memory card 90.

Controller 94 controls the memory 96 and output via device connector 92 and shieldless USB tab 93. Device connector 92 may be electrically coupled directly to controller 94 and then to memory 96. Shieldless USB tab 93 may also be electrically coupled to memory 96 via controller 94.

Memory card 90 may include controller 94 conforming to a flash memory controller with USB control and memory 96 conforming to a flash memory. Device connector 92 may couple to a portable device contact conforming to the Memory Stick standard. Shieldless USB tab 93 may couple directly to a computing device's USB port allowing communication between the computing device and controller 94 without an adaptor or reader. The flash memory controller with USB control may be developed as an application specific integrated circuit (ASIC) integrating the functionality of a conventional flash memory controller and a USB controller.

Figure 10:
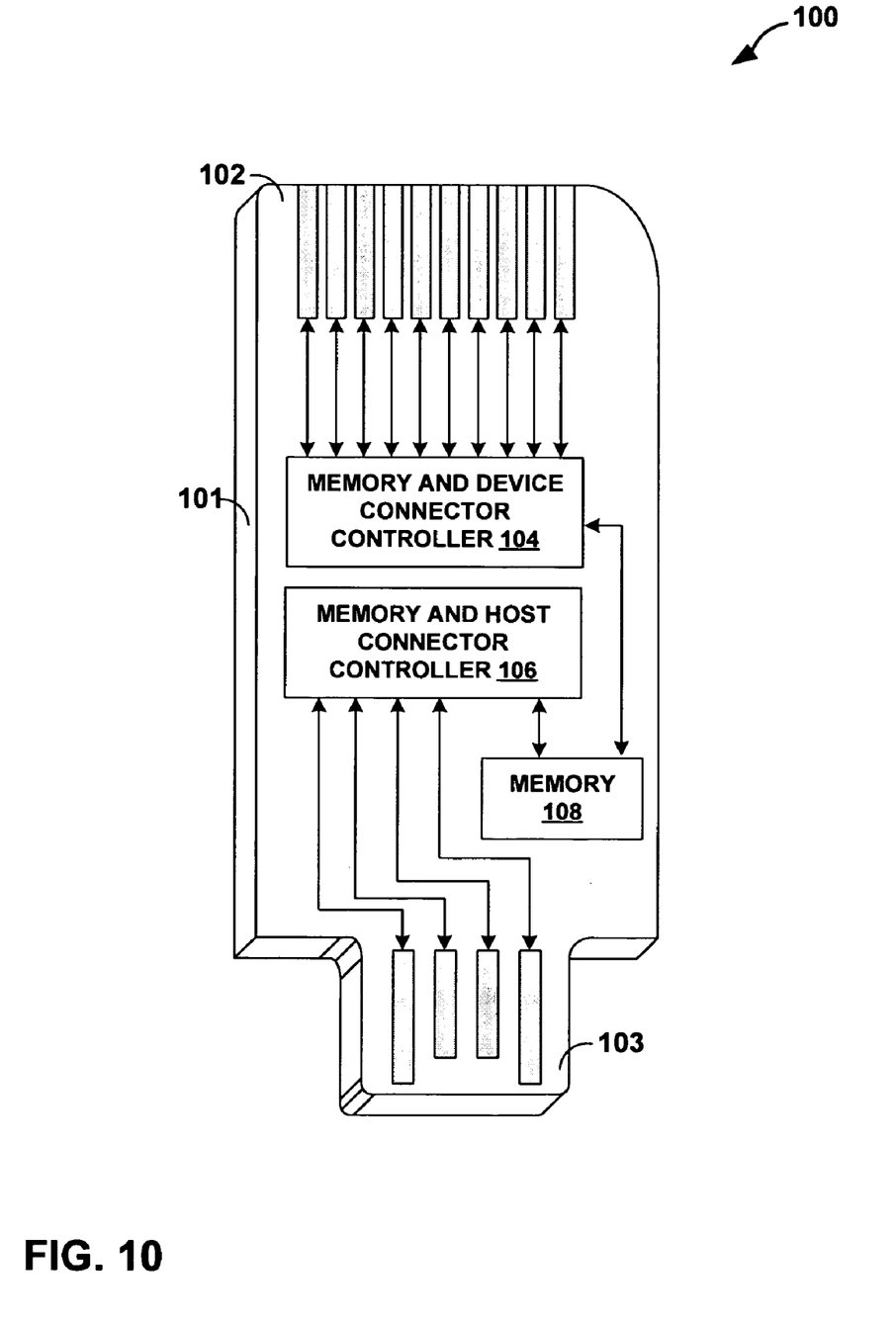

FIG. 10 is a block diagram illustrating another exemplary memory card 100 that can be used according to embodiments of the invention. As shown, memory card 100 includes a memory 108, a device connector 102, a memory and device connector controller 104, a memory and host connector controller 106, and a host connector 103. Memory 108, device connector 102, and host connector 103 may operate substantially similar to memory 72, device connector 62 and host connector 63, respectively, from FIG. 7.

Whereas the architecture shown in FIG. 7 utilizes three separate controllers, i.e., one for device connector 62, one for host connector 63, and one for memory 72, the embodiment of FIG. 10, integrates memory control into the controller for device connector 102. Memory control is also integrated into the controller for host connector 103 as a common memory and host connector controller 106. Such integrated controllers 104, 106 may consume less space and power than three separate controllers. Moreover, controllers that integrate the memory and connector controls are commercially available for use in conventional memory cards that include a memory and a single device connector. Additionally, controllers that integrate the memory and host connector controls are also commercially available for use in conventional portable memory drives that include a memory and a single host connector.

Memory and device controller 104 controls memory 108 and output via device connector 102. Memory and host controller 106 also controls memory 108 and output via host connector 103. Device connector 102 may be electrically coupled to memory 108 via memory and device controller 104. Host connector 103 may be electrically coupled to memory 108 via memory and host controller 106.

In one embodiment of the invention, memory card 100 includes device connector 102 conforming to a Memory Stick standard and host connector 103 conforming to an USB standard. Memory card 100 also includes memory and device controller 104 conforming to a flash memory card controller, memory 108 conforming to a flash memory, and memory and host controller 106 conforming to a flash memory drive controller. These components are readily available due to their wide usage in traditional removable memory cards and traditional removable memory drives. In this embodiment, all the elements included in memory card 100 are already being produced for other purposes and may be purchased directly from the manufacturer.

Various embodiments of the invention have been described. For example, memory cards, including a device connector and host connector, have been described that have dimensions substantially conforming to dimensions of a memory card standard. As mentioned, the dimensions may include a height that is one of approximately 31 mm and approximately 50 mm, a width that is one of approximately 20 mm and approximately 21.5 mm, and a thickness that is one of approximately 1.6 mm and approximately 2.8 mm.

Although various embodiments have been described in the context of the Memory Stick standard, various features described herein may also find use with other standards. For example, the memory card including one or more features described herein may alternatively conform to a Compact Flash standard, a MultiMedia Card standard, a Secure Digital standard, a Smart Media standard, an xD standard, a yet released standard, or the like.

The host connector of the memory card has been exemplified by a shieldless USB tab. As discussed above, it may be necessary to use a shieldless USB tab if the memory card standard has a thickness that is less than the thickness of a conventional USB tab. Alternatively, the host connector may comprise a personal computer memory card international association (PCMCIA) standard including a 16 bit standard PC Card standard and a 32 bit CardBus standard, a Universal Serial Bus (USB) standard, a Universal Serial Bus 2 (USB2) standard, an IEEE 1394 FireWire standard, a Small Computer System Standard (SCSI) standard, an Advance Technology Attachment (ATA) standard, a serial ATA standard, a Peripheral Component Interconnect (PCI) standard, a PCI Express standard, a conventional serial or parallel standard, or the like. The standards described herein refer to such standards as defined on the filing date of this patent application.

In addition, a cover may fit over the host connector of the memory card in order to conform the form factor of the memory card to the form factor of the memory card standard. Exemplary covers are described such that positioning of the cover may be done by removing the cover, rotating the cover via a hinge, forcing the cover to retract over the housing, or the like. There may be any number of covers for each of the embodiments of covers described above. Each cover described may cover one or more connectors. In this manner, a cover may fit over both the device connector and the shieldless USB tab. For example, cover 59 from FIG. 6A may fit over device connector 52 and shieldless USB tab 53. Many other embodiments of covers may be used in conforming the form factor of a memory card to the form factor of a memory card standard. These and other embodiments are within the scope of the following claims.

What is claimed is:

1. A memory card comprising:
   a housing;
   a memory in the housing;
   a device connector accessible through the housing, the device connector conforming to a device connection standard and allowing access to the memory by a device compatible with the device connection standard; and
   a host connector protruding from the housing, the host connector conforming to a host connection standard and allowing access to the memory upon insertion of the host connector into a computer interface compatible with the host connection standard, wherein the housing and the host connector protruding from the housing define memory card dimensions which substantially conform to dimensions of a memory card standard including a height that is one of approximately 31 mm and approximately 50 mm, a width that is one of approximately 20 mm and approximately 21.5 mm, and a thickness that is one of approximately 1.6 mm and approximately 2.8 mm.

2. The memory card of claim 1, wherein the device connection standard comprises a Memory Stick standard.

3. The memory card of claim 1, wherein the host connection standard comprises a Universal Serial Bus (USB) standard.

4. The memory card of claim 1, wherein the host connector comprises a shieldless Universal Serial Bus (USB) tab.

5. The memory card of claim 1, further comprising a memory card control unit that accepts firmware updates via the host connector interface.

6. The memory card of claim 5, wherein the memory is partitioned such that the firmware updates are stored in a first partitioned section of the memory and a data storage area is defined in a second section of the memory.

7. The memory card of claim 1, further comprising ridges that extend from the device connector between electrical contacts of the device connector.

8. The memory card of claim 1, wherein the host connector protrudes from an edge of the memory card, wherein a thickness of the host connector is less than or equal to the thickness of the memory card, and wherein the host connector protrudes from a central region of the edge of the memory card.

9. The memory card of claim 1, further comprising a cover that fits over the host connector, such that the housing and the cover collectively define a form factor of the memory card that substantially conforms to a form factor of the memory card standard.

10. A memory card comprising:
a housing;
a memory in the housing;
a device connector accessible through the housing, the device connector conforming to the device connection standard and allowing access to the memory by a device compatible with the device connection standard;
a host connector protruding from the housing, the host connector conforming to a host connection standard and allowing access to the memory upon insertion of the host connector into a computer interface compatible with the host connection standard; and
a cover to cover the host connector, wherein the housing and the cover collectively define a form factor of the memory card that substantially conforms to a form factor of the memory card standard.

11. The memory card of claim 10, wherein the host connection standard comprises one of a personal computer memory card international association (PCMCIA) standard, a PC Card standard, a CardBus standard, a Universal Serial Bus (USB) standard, a Universal Serial Bus 2 (USB2) standard, an IEEE 1394 FireWire standard, a Small Computer System Interface (SCSI) standard, an Advance Technology Attachment (ATA) standard, a serial ATA standard, a Peripheral Component Interconnect (PCI) standard, a PCI Express standard, and a conventional serial or parallel standard; and the device connection standard comprises one of a Compact Flash standard, a Smart Media standard, a MultiMedia Card standard, a Secure Digital standard, a Memory Stick standard, and an xD standard.

12. The memory card of claim 10, wherein the host connection standard comprises a Universal Serial Bus (USB) standard, and the device connection standard comprises a Memory Stick standard.

13. The memory card of claim 10, wherein the cover is removable from the memory card.

14. The memory card of claim 10, wherein the cover is connected to the housing via a hinge.

15. The memory card of claim 10, wherein the cover comprises a plurality of cover sections, each cover section being hinged to the housing.

16. The memory card of claim 10, further comprising another cover that fits over the device connector.

17. The memory card of claim 10, wherein the cover is retractable over the host connector such that the host connector extends through an opening in the cover when the cover is in a retracted position.

18. The memory card of claim 17, wherein the opening defines a size that substantially corresponds to the host connector.

19. The memory card of claim 17, wherein the opening defines a size that substantially corresponds to the housing.

20. The memory card of claim 10, wherein the host connector comprises a shieldless Universal Serial Bus (USB) tab.

* * * * *